Dec. 20, 1966    W. G. L. NICOLL    3,292,549
MOTOR DRIVEN PUMPS

Filed Feb. 3, 1965    2 Sheets-Sheet 1

Dec. 20, 1966   W. G. L. NICOLL   3,292,549
MOTOR DRIVEN PUMPS

Filed Feb. 3, 1965   2 Sheets-Sheet 2

United States Patent Office 3,292,549
Patented Dec. 20, 1966

3,292,549
MOTOR DRIVEN PUMPS
Walter G. L. Nicoll, London, England, assignor to Renwick, Wilton & Dobson, Limited, Devonshire, England, a corporation of Great Britain
Filed Feb. 3, 1965, Ser. No. 430,046
Claims priority, application Great Britain, Feb. 11, 1964, 5,686/64
6 Claims. (Cl. 103—87)

This invention concerns improvements in or relating to pumps.

In U.S. Patent No. 3,164,097, we have described and claimed a circulating pump of the centrifugal type having an impeller mounted on one end of a shaft also constituting the shaft of an associated motor, in which the impeller is mounted on said shaft with its inlet side towards said motor and a single thrust bearing is associated with said shaft at the opposite end of said motor from said impeller, said thrust bearing being adjustable so that the axial position of said shaft and said impeller may be varied.

The construction there disclosed is outstandingly effective for use in water circulating systems such as those used in current domestic central heating installations, since it enables a combined motor and pump unit to be provided which is flat-based and of reasonably small size and neat appearance suitable to be mounted in line with the pipework, and moreover the output from the pump may be varied as required while the motor is running at its optimum speed.

We however have now found that all these advantages can still be secured yet at the same time the overall height of the pump and motor assembly can be substantially reduced together with increased economy in manufacture and ease of assembly by adopting the improved construction of the present invention. This enables the axis of the motor and impeller assembly to be arranged, approximately parallel to the plane of the base rather than at right angles thereto.

According to the invention there is therefore provided a motor driven centrifugal circulating pump having an impeller mounted on a shaft which also constitutes the shaft of the motor and having a single thrust bearing at one end of the shaft which thrust bearing is externally adjustable, characterised in that the impeller is mounted on said shaft with its inlet side facing away from said motor and towards said adjustable thrust bearing which is disposed at the end of the shaft remote from the motor.

The construction of the invention can be adopted no matter how the axis of the impeller shaft lies relative to the base of the assembly but its advantages display themselves most fully when the axis lies parallel to the plane of the base, and the most compact construction can be achieved when it is in fact parallel to the line of the pump inlet and outlet.

While the axially-shiftable impeller-shaft may be splined to the shaft of the motor, as may for instance be necessary where the latter is a commutator-type electric motor, it is in fact preferred to employ as the motor an electric motor of the induction type and to provide a common shaft for both the motor rotor and the impeller. The motor is in fact advantageously of the wet-running canned-rotor electric induction motor type.

It is particularly convenient in such a case to utilize a motor unit encased in moulded block of synthetic resin and comprising an outer hollow stator member and an inner rotor member enclosed within said outer member, in which the outer stator member comprises an assembly of elements including laminations and coils encased in a moulded block of synthetic resin or like insulating material, said elements also including mounting means having an aperture not smaller than the maximum cross-section of the inner member, said aperture being fitted with a detachable cover-plate.

While highly suitable for instance in pumps for central heating installations because it can run in water without any need to provide a sealing sleeve between rotor and stator this construction of electric motor does have one disadvantage. The complete encasing of the stator assembly within a moulded block of synthetic resin has the result that should any of its field coils (i.e. the windings associated with the core laminations which form the stator) be damaged e.g. during the curing of the block of moulded synthetic resin or be damaged or burnt out subsequently they cannot readily be replaced, but instead it becomes necessary to replace the entire moulded stator assembly.

This is peculiarly disadvantageous with any such system as a central heating installation, since the replacement of the stator, flooded normally as it is with water, may require the entire installation to be shut down before it can be carried out.

We have however now found that this disadvantage can be overcome if the stator field coil is disposed unsymmetrically to one side only of the rotor (in a manner reminiscent of electric motors of the off-set field-coil type of construction which has been normally adopted hitherto so as to reduce the number of field coils to the minimum where it is desired to make a very inexpensive motor) and if moreover that part of the stator assembly associated with the field coil (or coils) is separable from the other parts thereof surrounding the rotor.

According to another feature of the present invention therefore the said motor comprises an inner rotor member mounted within a hollow outer stator member which comprises a main stator segment including an assembly of magnetic core elements disposed about the rotor and having an end aperture closable by a detachable cover plate and through which the rotor can be inserted or withdrawn, said assembly being formed in a moulded block of synthetic resin or like water-resistant electrically-insulating material, and an offset stator segment including magnetic core elements directly associated with field coil(s) energisable to move the rotor, the magnetic core elements of the main stator segment and the offset-stator segment being disposed adjacent each other at mating surfaces to complete a magnetic circuit from the field coil(s) via said segments around the rotor, means being provided releasably to secure said mating surfaces in engagement thus supporting the offset stator segment to one side of the main stator segment where it may be separated therefrom.

In an electric motor the magnetic core elements of both the main stator segment and the offset stator segment will be built up from a pack of laminations, and in accordance with this invention only the lamination pack of the main stator segment must be encased or "potted" in a moulded block of synthetic resin or like insulating material. Obviously the offset segment lamination pack may also be encased provided this is done separately.

It will be appreciated that with this form of construction the operating parts of the pump are still encased in a moulded block of synthetic resin or like insulating material, yet the field coil mounted upon the offset-stator segment can be replaced whenever necessary while the main segment remains in situ. As soon as a repaired or fresh field coil is refitted the pump however can be restored to operation since the magnetic circuit is then again complete.

The mating surfaces are most conveniently separably interconnected by forming a dovetail rib and complementary groove at right angles to the plane of the lamination pack which forms the core of the stator assembly. The main stator segment and the offset stator segment can then be readily separated by simply sliding them apart.

The insulating material encasing the main stator segment assembly will preferably cover only their exterior surfaces, and in particular the mating surfaces of the main segment and the offset segment will desirably be left uncovered so as not to impair the magnetic circuit.

The moulded block of synthetic resin or like insulating material forms the main body or frame of the pump, and it can also extend over one end of the rotor housing to form an integral cover. The cover at that end, whether it is integral or in the form of a cover-plate, can if desired include a journal bearing assembly for one end of the rotor shaft.

In order that the invention may be well understood some preferred embodiments will now be described, though by way of illustration only, with reference to the accompanying drawings, in which.

Figure 1:
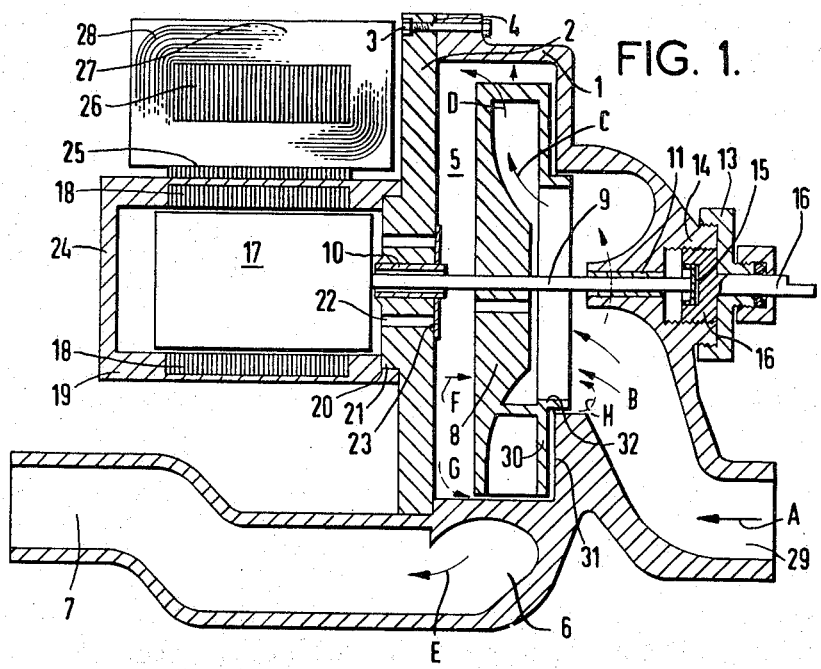
FIGURE 1 is a view, mainly in cross-section, taken vertically through the axis of a canned-rotor electric-motor and centrifugal-type water-pump assembly suitable for use in a domestic central heating installation.

Referring to FIG. 1 of the drawings, the centrifugal pump housing comprises a volute casting 1 and a cover plate casting 2 joined together by nuts 3 and bolts 4 (of which only one pair is shown) arranged around the periphery of the two castings and passing through apertures provided at the edges thereof. These castings 1 and 2 together enclose a substantially cylindrical pump chamber generally indicated 5 which communicates via a spiral passage 6, formed in the volute casting 1 and disposed around the outside of the pump chamber 5, with pipe 7 which forms the outlet of the pump.

Within the pump chamber 5 there is disposed the single entry impeller 8 which is rotatably mounted upon shaft 9 carried in a journal bearing 10 through the cover plate casting 2 and whose other end is supported in a journal bearing 11 mounted in the volute casting 1. A cap 13 is threadedly engaged with an annular boss 14 provided externally of the volute casting 1. Within the cap 13 and in running engagement with the end of the shaft 9 is a thrust bearing 15, formed of any suitable bearing metal or perhaps better of polytetrafluoroethylene, whose axial location can be set or adjusted by means of externally-operable adjustment screw 16.

At its lefthand end (as shown in the drawings) the shaft 9 after passing through journal bearing 10 is secured to rotor 17 of the canned-rotor electrical motor used to drive the pump. The rotor 17 is supported by the shaft 9 within a motor housing which comprises a magnetic core lamination pack 18 surrounding the rotor 17 and encased within an injection moulded synthetic resin block 19, formed conveniently of polypropylene. The moulded block 19 also includes an internally-threaded end-ring 20 which is threadedly-engaged with a cylindrical boss 21 provided externally of the pump cover plate casting 2. Through this boss 21 extend passages 22 via which water from the pump chamber 5 can circulate to cool the motor, the ingress of large particles of solid matter being barred by a wire-mesh filter ring 23.

Figure 2:
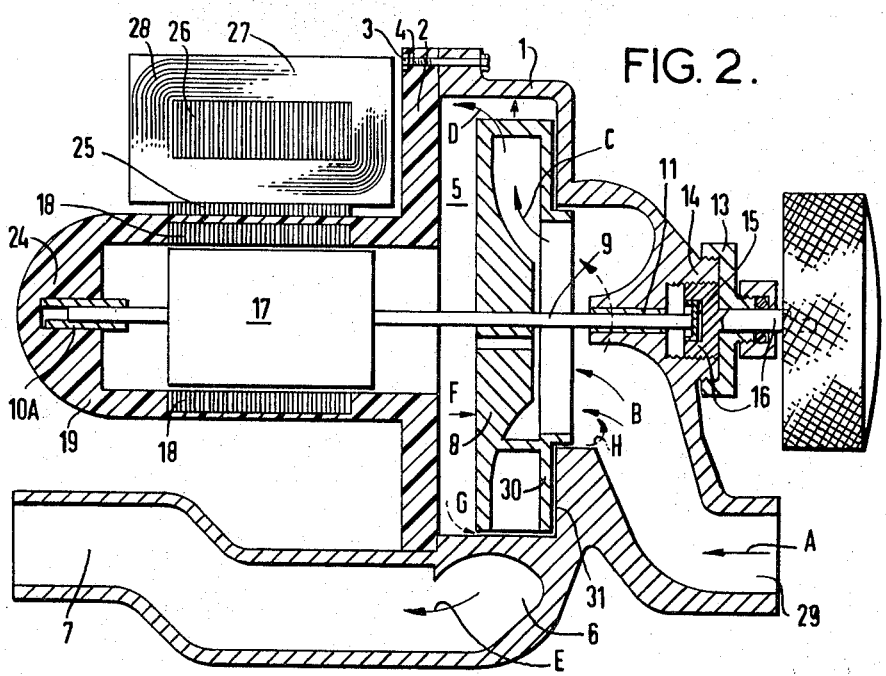
FIGURE 2 is a similar view of an alternative embodiment.

It will be noted that as shown in FIGURE 1 the rotor 17 is unsupported within the motor housing except by the shaft 9, but it will of course be understood that if desired a journal bearing for the unsupported end of the shaft 9 can be provided upon the end wall 24 of the motor housing, and this indeed is the construction shown in the embodiment of FIGURE 2, in which a separate cover plate casting 2 is omitted and the shaft 9 must then be supported within the motor housing by a journal bearing 10A. Moreover, in both FIGURES 1 and 2 the end wall 24 can if desired be formed not integrally with the rest of the housing as shown but instead as a detachable end cover-plate.

The magnetic core lamination pack 18 is provided with arms 25 (of which only one is visible in the drawings) which protrude from the moulded block 19 and detachably interconnect with an offset field core lamination pack 26 upon which is mounted a bobbin 27 of synthetic resin or like material about which is wound a field coil shown diagramatically at 28.

Figure 3:
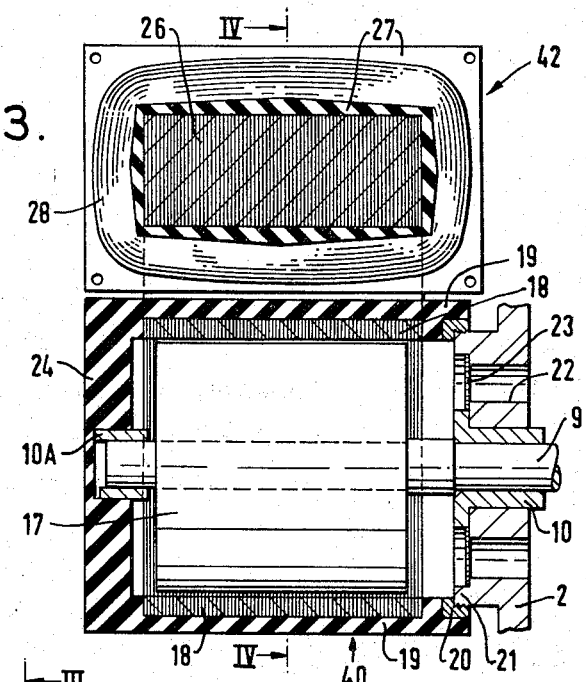
FIGURE 3 is a vertical view, mainly in cross-section taken along the line III—III in FIGURE 4, of an electric motor similar to that shown in FIGS. 1 and 2.
Figure 4:
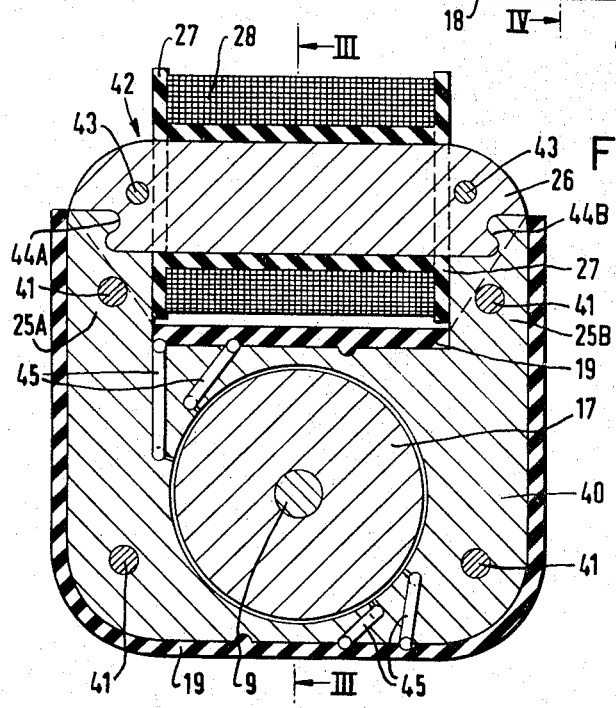
FIGURE 4 is a horizontal view mainly in cross-section on the line IV—IV in FIGURE 3.

Reference will now be made to FIGURES 3 and 4 for a fuller description of a preferred form of a motor which may be incorporated in some embodiments of the invention. The electric motor shown in these figures comprises a rotor 17 carried on a shaft 9 whose lower end is provided with a driving connection (not shown) to a pump of the kind shown in FIGURES 1 and 2. The rotor 17 is housed within a main stator segment 40, comprising a solid moulding 19 of a synthetic resin (such as an acetal or epoxy resin, polytetrafluoroethylene, or a polytetrafluoroethylene-based material) encasing an assembly of components including core laminations 18, held in a lamination pack by rivets 41.

The moulding 19 is closed by an end plate 24 which carries a journal bearing assembly 10A (which may be made of any suitable bearing metal or polytetrafluoroethylene) receiving the upper end of the shaft 9. The end plate 24 is integrally moulded with the moulding 19.

At the lower end of the main stator segment the moulded assembly includes an internally-threaded annular attachment plate or moulded end ring 20 having an aperture through which the rotor can be inserted or withdrawn, to which is secured an externally-threaded annular boss 21 on a cover plate casting 2 of the pump which is to be driven. The cover plate casting 2 carries a journal 10 for the shaft 9, and is apertured to provide passages 22 through which pump water can circulate to cool the motor, covered by wire-mesh filters 23 to prevent entry of large particles of solid matter.

Protruding from the synthetic resin casing 19 of the main stator segment 40 are arms 25A and 25B of the main lamination pack 18, whose ends are so shaped as together to form a dovetail groove running at right angles to the plane of the lamination pack. This groove embraces a complementary dovetail rib formed in offset stator segment 42, equally at right angles to offset lamination pack 26, which is held together by rivets 43. The mating surfaces (indicated at 44A and 44B) of the complementary dovetail rib and groove complete the magnetic circuit between the main segment 40 and the offset segment 42 and enables the former to be permeated by the magnetic flux generated by energisation of field coil 28 which is wound about a synthetic resin bobbin 27 which is mounted about the offset lamination pack 26. Energisation of the field coil 28 thus sets the rotor 17 in motion, the self-starting effect being ensured by the shading pole rings 45 (superimposed on FIGURE 4).

The operation of the embodiments of the invention illustrated is as follows.

When the field coil 28 is energised the rotor 17 is set in motion, and via shaft 9 it turns the impeller 8 which draws water from the inlet 29 in the direction of arrow A into the central single inlet of the impeller 8, as shown by arrows B, and then by centrifugal force flings it outwardly, as shown by arrows C and D, into the pump chamber 5, thus creating a greater pressure on the outlet side of the impeller, within pump chamber 5, than on the inlet side of the impeller, in the area B. This increased pressure discharges itself through passage 6, in the direction of arrow E, to the pump outlet 7 and also has the effect of pressing the impeller 8, in the direction F and hence the shaft 9 against the thrust bearing 15.

It will however be noted that while the annular plate 30 which lies on the inlet side of the impeller 8 is shown in close proximity to the adjacent face 31 of the volute casting 1 the axial length of the impeller skirt 32 which constitutes the single entry to the impeller is less than the available axial movement of the floating impeller 8 in the pump chamber 6. Hence, adjustment of the axial location of the thrust bearing by means of adjustment screw 16 will alter the distance between plate 30 and face 31, and thus vary the size of the return path for water from the chamber 5 to the inlet 29 between these surfaces. Along this return path, indicated by dotted arrows G and H, the pressure generated within the chamber 5 by the impeller can of course also discharge itself back to the inlet of the pump rather than to its outlet, and clearly the more it does so the smaller will be the output of water from outlet 7. Thus, by varying the axial location of the shaft 9 under the control of adjustment screw 16 it is very simply possible to vary the output of the pump assembly as a whole while allowing the motor to run always at or about its optimum speed. All the advantages of our previous pump construction as disclosed in the aforesaid U.S. Patent No. 3,164,097 are thus secured, but in a somewhat different and for many purposes superior manner. In particular the overall height of the whole assembly may be significantly reduced. This is not altogether apparent from the accompanying drawings which have been somewhat simplified and distorted to give greater ease of understanding. In practice however this construction can be made every compact and neat in appearance. In particular, though for convenience in the drawings the offset field coil (25, 26, 27 and 28) has been shown vertically above the motor housing proper this can be arranged in a horizontal plane with the motor shaft—and of course the nuts and bolts (3 and 4) which join the pump castings can also be disposed elsewhere than on the periphery rather than at the top, thus again reducing the height of the whole assembly and giving it a neater appearance. The invention in fact is not limited to use with off-set field coil motors, nor indeed is it absolutely necessary even to employ a motor of the induction type, provided that suitable modifications are made as will be apparent to those skilled in the art. The use of a wet-running canned-rotor electric induction motor is however recommended for economy in manufacture, for reliability of operation and ease of servicing, and especially when using an offset field coil motor it will be noted that additional advantages in compactness of design and ease of removal and renewal of field windings without the need to disconnect the assembly in which it will normally be operating are achieved.

I claim:

1. In a circulating pump unit of the centrifugal type comprising in combination, an electric motor having a rotor and a stator, a floating shaft to which the rotor of said motor is secured, a pump assembly secured to one end of said electric motor so that said shaft also extends into said pump assembly, said pump assembly including a housing having an inlet means and an outlet means, the improvement which comprises securing a single entry impeller for the pump assembly on said fully floating shaft with its entry facing away from said motor and providing a single thrust bearing for said shaft at the end of said shaft remote from said motor, and an operating member for adjusting the position of said thrust bearing externally of the pump housing, said single entry impeller being axially movable within the pump housing and having a skirt constituting its single entry which skirt is axially shorter than the axial movement available to the impeller upon operation of said operating member so as to permit variation of the output of the pump whilst the latter is operating.

2. A circulating pump unit as set forth in claim 1 in which the pump housing comprises a base for said pump unit and a casing having a volute outlet portion, and in which the inlet to said single entry impeller and the outlet from said volute casing of said pump are substantially in alignment with each other and parallel to the axis of said shaft and the base of the pump unit.

3. A circulating pump unit as defined in claim 1, in which said motor comprises an inner rotor member mounted within a hollow outer stator member which comprises a main stator segment including an assembly of magnetic core elements disposed about the rotor and having an end aperture closable by a detachable cover plate and through which the rotor can be inserted or withdrawn, said assembly being formed in a moulded block of synthetic resin or like water-resistant electrically-insulating material, and an offset stator segment including magnetic core elements directly associated with at least one field coil energisable to move the rotor, the magnetic core elements characterized in that the main stator segment and the offset-stator segment are disposed adjacent each other at mating surfaces to complete a magnetic circuit from such field coil via said segments around the rotor, means being provided releasably to secure said mating surfaces in engagement thus supporting the offset stator segment to one side of the main stator segment where it may be separated therefrom.

4. A circulating pump unit comprising a pump, an electric motor and a common shaft for the pump and the motor said motor comprising an inner rotor member mounted within a hollow outer stator member which comprises a main stator segment including an assembly of magnetic core elements disposed about the rotor and having an end aperture closable by a detachable cover plate and through which the rotor can be inserted or withdrawn, said assembly being formed in a moulded block of synthetic resin or like water-resistant electrically-insulating material, and an offset stator segment including magnetic core elements directly associated with at least one field coil energizable to move the rotor, the magnetic core elements of the main stator segment and the offset-stator segment being disposed adjacent each other at mating surfaces to complete a magnetic circuit from such field coil via said segments around the rotor, means being provided releasably to secure said mating surfaces in engagement thus supporting the offset stator segment to one side of the main stator segment where it may be separated therefrom.

5. A circulating pump unit as defined in claim 4 wherein said mating surfaces are separably interconnected by a dovetail connection at right angles to the plane of the mating parts of said assembly.

6. A circulating pump as defined in claim 1, in which the mating surfaces of the magnetic core elements and the offset-stator segments are separably interconnected by a dovetail connection at right angles to the plane of the mating parts of said assembly.

References Cited by the Examiner

UNITED STATES PATENTS

| 1,433,037 | 10/1922 | Reid | 103—87 X |
| 2,518,597 | 8/1950 | Brooks | 103—87 |
| 2,669,187 | 2/1954 | Guyer. | |
| 2,857,849 | 10/1958 | Pezzillo | 103—87 |
| 3,041,976 | 7/1962 | Maynard | 103—87 |
| 3,072,062 | 1/1963 | Cralle et al. | 103—87 |
| 3,085,513 | 4/1963 | Zimmermann | 103—87 |

ROBERT M. WALKER, *Primary Examiner.*